(12) United States Patent
Uhlmann

(10) Patent No.: US 7,088,994 B2
(45) Date of Patent: Aug. 8, 2006

(54) NETWORK ADDRESS LOOKUP FOR TELEPHONY DEVICES

(75) Inventor: Gregory John Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 09/908,026

(22) Filed: Jul. 18, 2001

(65) Prior Publication Data

US 2003/0017824 A1    Jan. 23, 2003

(51) Int. Cl.
  *H04M 3/42* (2006.01)
(52) U.S. Cl. ............... 455/416; 455/414.1; 455/414.2; 455/415
(58) Field of Classification Search ............... 455/502, 455/550, 564, 414, 418, 422, 416, 414.1, 455/414.2, 415; 379/201, 201.01, 142, 229, 379/354, 221.02
  See application file for complete search history.

(56) References Cited

U.S. PATENT DOCUMENTS

| | | | | |
|---|---|---|---|---|
| 5,136,637 A | * | 8/1992 | Rust et al. | 379/355.07 |
| 5,561,704 A | * | 10/1996 | Salimando | 455/456.5 |
| 5,668,862 A | * | 9/1997 | Bannister et al. | 379/207.14 |
| 5,844,975 A | * | 12/1998 | Sugawara et al. | 379/142.15 |
| 5,883,943 A | * | 3/1999 | Siddiqui | 379/142.02 |
| 5,924,035 A | * | 7/1999 | Joensuu | 455/445 |
| 5,940,484 A | * | 8/1999 | DeFazio et al. | 379/142.06 |
| 5,974,128 A | * | 10/1999 | Urban et al. | 379/221.09 |
| 6,005,927 A | * | 12/1999 | Rahrer et al. | 379/142.01 |
| 6,192,242 B1 | * | 2/2001 | Rollender | 455/433 |
| 6,205,139 B1 | | 3/2001 | Voit | 370/389 |
| 6,226,678 B1 | * | 5/2001 | Mattaway et al. | 709/230 |
| 6,356,756 B1 | * | 3/2002 | Koster | 455/445 |
| 6,374,100 B1 | * | 4/2002 | Smith et al. | 455/419 |
| 6,694,375 B1 | * | 2/2004 | Beddus et al. | 709/249 |
| 6,711,239 B1 | * | 3/2004 | Borland | 379/67.1 |
| 6,718,030 B1 | * | 4/2004 | Turner et al. | 379/221.02 |
| 2002/0068599 A1 | * | 6/2002 | Rodriguez et al. | 455/550 |
| 2002/0110233 A1 | * | 8/2002 | Henderson et al. | 379/214.01 |
| 2003/0007626 A1 | * | 1/2003 | Glebocki | 379/229 |
| 2003/0026405 A1 | * | 2/2003 | Elsey et al. | 379/201.01 |
| 2004/0170257 A1 | * | 9/2004 | Gross et al. | 379/67.1 |

* cited by examiner

*Primary Examiner*—Matthew Anderson
*Assistant Examiner*—Tan Trinh
(74) *Attorney, Agent, or Firm*—Patterson & Sheridan LLP

(57) ABSTRACT

Embodiments of the present invention generally provide systems, methods and articles of manufacture for locating one component of callee information in response to receiving another associated component of the callee information. In a particular embodiment, a user inputs a network address (e.g., a telephone number) into a telephony device. The telephony device then operates to access a local directory in an effort to locate a callee name associated with a network address. If the callee name cannot be found in the local directory, a request for the callee name is transmitted to a remote directory.

24 Claims, 4 Drawing Sheets

NETWORK ADDRESS LOOKUP FOR TELEPHONY DEVICES

BACKGROUND OF THE INVENTION

1. Field of the Invention

The present invention generally relates to computerized systems and data processing. More particularly, embodiments provided herein are related to telecommunications.

2. Description of the Related Art

Being readily available for telephone contact has become increasingly important for a growing number of people who have a significant need to be reachable regardless of their location. Many such persons have a telephone for business, a telephone for home, a mobile cellular telephone in the car, a transportable telephone for personal wear, as well as stations providing telephone service through computers. Business people and professionals at times have multiple offices and may additionally work at a home office. All of these telephones and computer stations generally have different telephone numbers and Internet addresses. This requires a caller to know or look up multiple numbers and addresses, and frequently to make multiple calls in order to reach a person.

One attempt to facilitate telecommunications is the provision of a directory stored locally on a user's telephone unit. The directory is in essence an electronically stored phone book containing the names and numbers of individuals or entities the user frequently calls. The directory may be manually customized by the user or may be automatically built over time by the telephone unit itself. In the latter case, the telephone unit simply stores all outgoing numbers and/or incoming numbers and names (if available). When the user later makes a call to number stored in the directory, the related name may be displayed to the user. By verifying the number dialed (or selected from the directory) against the displayed information, the user can confirm that the call is being placed to the right person or entity.

While the use of the locally stored directory in this manner provides some assurance of having placed a call correctly it is limited to information which is actually stored in the directory. Further, because the local directories are of limited size (i.e., memory), it is not feasible to store all assigned numbers in the directories. As a result, users often make calls to a number or entity not contained in the local directory. In such cases, the directory is of no value and merely indicates to the user that no information is available for the number dialed.

To remedy the foregoing problem, remotely located directories were introduced. These remotely located directories are accessed each time a call is placed by a user authorized to use the directory. Because the remotely located directory can be contained in large databases, the volume of assigned numbers and associated names contained therein is significantly greater than that of the locally stored directories. Further, the databases need not be singular but can be made up of a network of databases maintained by different entities Theoretically, it is therefore possible to give users access to every assigned number in the world. Thus, the likelihood of locating the number/name somewhere on the network is high.

However, while remotely located directories provide access to voluminous information they typically come at a cost to the user. In particular, the time to access the network can be high, resulting in increased overhead to the user. Further, a network connection is needed to access the remotely located directories, thereby increasing network traffic. End users may also find remotely located directories undesirable because they typically have no control over the manner in which the information is organized or provided.

Therefore, there is a need to combine the advantages of local directories with remote directories in the context of telecommunications.

SUMMARY OF THE INVENTION

The present invention generally provides embodiments for locating one component of callee information in response to receiving another associated component of the callee information.

One embodiment provides a method of providing directory information to a user of a telephony device. The method comprises receiving a user input comprising a network address; determining whether a callee name associated with the network address is located in a local directory residing on the telephony device; and if the callee name is not located in the local directory, requesting the callee name from a remote directory not located on the telephony device.

In another embodiment, a telephony device comprises a communications facility configured to communicate with the telecommunications network; wherein the communications facility and the telecommunications network are configured to support transmission of at least voice data; a memory; and a processor. The memory contains at least a lookup program and a local directory, wherein the local directory comprises a plurality of records, each record comprising a callee network address and an associated callee name. The processor which, when configured with the lookup program, is configured to, upon receiving a user input comprising a network address, determine whether a callee name associated with the network address is located in the local directory. If the callee name associated with the network address is not located in the local directory, the processor is configured to transmit, via the communications facility, a request for the callee name to a remote directory.

In yet another embodiment, a computer readable medium is provided and contains a program which, when executed by a processor, is configured to perform operations comprising parsing a user input comprising a network address; determining whether a callee name associated with the network address is located in a local directory residing on a telephony device; and if the callee name is not located in the local directory, requesting the callee name from a remote directory not located on the telephony device.

Still another embodiment provides a telecommunications system, comprising a network server comprising a database, the database containing at least a remote directory. The network server is configured to, upon receiving, from a requesting telephony, a request device for a callee name associated with a particular network address, access the remote directory to determine the availability of the callee name. The request is received only after the requesting telephony device has determined that the callee name is not available locally on the requesting telephony device. If the callee name is available in the remote directory, the network server is configured to transmit the callee name to the requesting telephony device via a network connection.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2A is an illustration of a local directory containing a plurality of records, each comprising one or more network addresses and an associated callee name.

DETAILED DESCRIPTION OF THE PREFERRED EMBODIMENT

Embodiments of the present invention generally provide systems, methods and articles of manufacture for locating one component of callee information in response to receiving another associated component of the callee information. In a particular embodiment, a user inputs a network address (e.g., a telephone number) into a telephony device. The telephony device then operates to access a local directory in an effort to locate a callee name associated with a network address. If the callee name cannot be found in the local directory, a request for the callee name is transmitted to a remote directory.

One embodiment of the invention is implemented as a program product for use with a computer system such as, for example, the network environment 100 shown in FIG. 1 and described below. The program(s) of the program product defines functions of the embodiments (including the methods described below) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
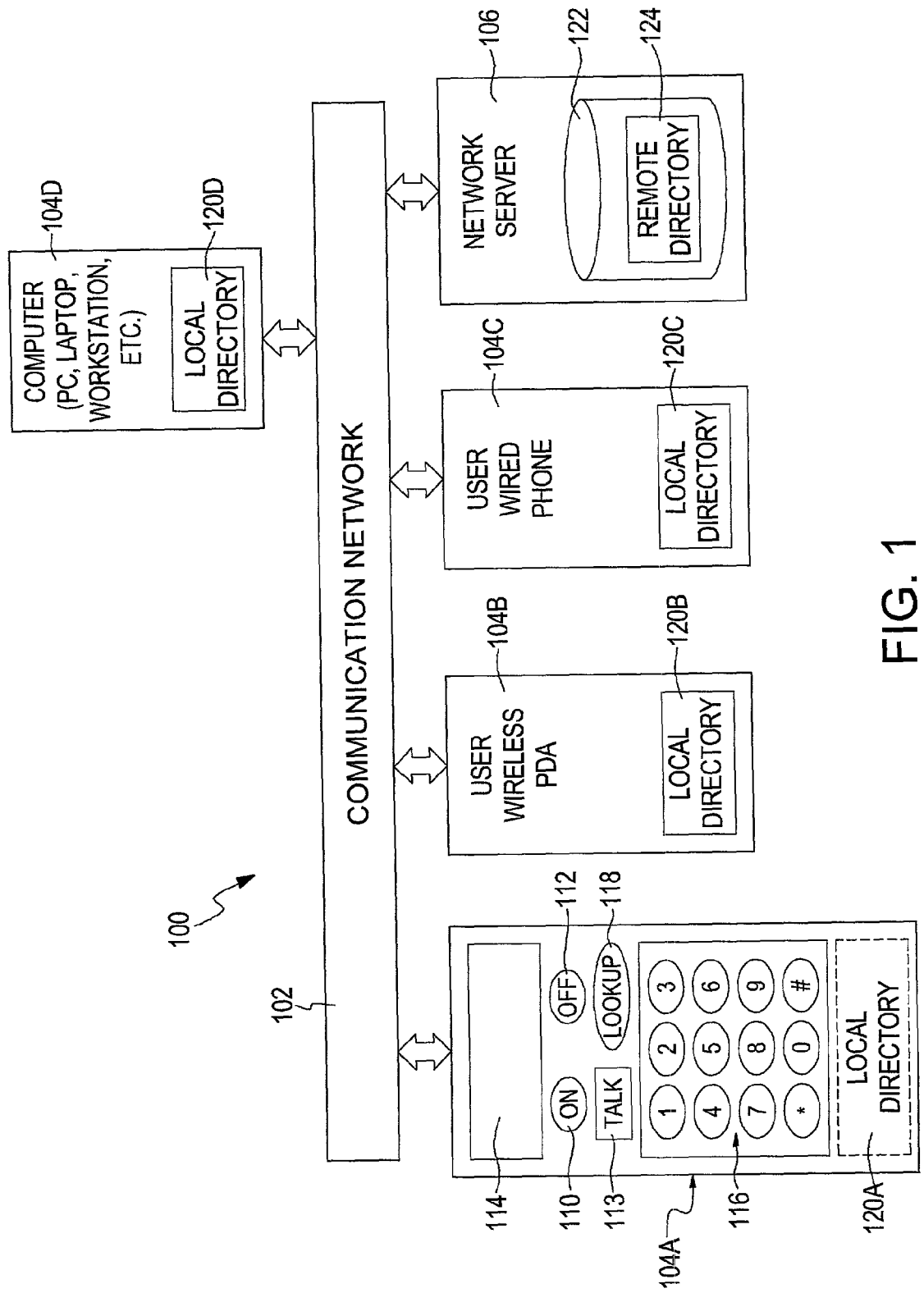
FIG. 1 is a schematic diagram of a network environment.

FIG. 1 is an illustrative network environment 100. In general, the network environment 100 includes a communications network 102, a plurality of telephony devices 104A–D (collectively referred to as "telephony devices 104") and a network server 106. The communications network 102 may be any system or combination of systems configured to allow communication between the telephony devices 104 Themselves, and between the telephony devices 104 and the network server 106. Illustratively, the communications network 102 may be configured for digital cellular (including PCS (personal communications services)), cellular (whether analog or digital), Cellular Digital Packet Data, Global System for Mobile Communication (GSM) and the like. The communications network 102 may also be a plain old telephone system (POTS). In a particular embodiment, the communications network 102 is a public packet data network, such as the Internet.

The telephony devices 104 may be any kind of wireless or wired communication devices capable of establishing a connection with the communications network 102. Although the telephony devices 104 are shown connected to an apparently singular communications network 102, the communications network 102 is in fact representative of one or more networks. As such, the telephony devices 104 may each be configured to communicate with the communications network 102 using different communications protocols. In the case where the communications network 102 is the Internet, the telephony devices 104 are enabled with Voice-over-IP (VoIP) telephony.

By way of illustration, the telephony devices shown in FIG. 1 include a wireless telephone 104A, a wireless personal digital assistant 104B (PDA), a land-based wired telephone 104C and a computer 104D. The wireless telephone 104A may include long range devices such as a digital or analog mobile telephones and may also include short range devices such as wireless telephones for household use. The PDA 104B (also called Personal Communication Device (PCD) and Personal Intelligent Communicator (PIC)) may comprise commercially available PDA devices such as the 3Com Palm, the Casio Casiopeia and the Hewlett Packard Jornada. The PDA 104B may use operating systems such the Palm Pilotm, the Windows CETM and the Handspring Visor™. The computer 104D represents any other computerized device such as a PC, laptop, workstation, etc., capable of sustaining data communications (and particularly voice communications) with the network 102.

The wireless telephone 104A is shown with some illustrative features which may also be included with the other telephony devices 104B–D. In general, the wireless telephone 104A includes an ON button 110, an OFF button 112, a talk button 113, a display screen 114, and a keypad 116. Although each of the buttons are configured for discrete functions, it is understood that any one of the buttons may be overloaded with two or more functions. In the illustrated embodiment, the ON button 110 and OFF button 112 are used to power up and power down, respectively, the wireless telephone 104A. The talk button 113, when pressed, initiates a telephone call and attempts to establish a network connection with another telephony device via the communications network 102. The display screen 114 provides a viewing area which may display information to a user. For example, the display screen 114 may display a number dialed, a name of the entity associated with the number (herein referred to as the "callee"), a counter indicating a duration of a call, battery power levels, etc. The keypad 116 is representative of any input interface. In one embodiment, the keypad may be replaced with or work in tandem with, voice recognition technology. Illustratively, the wireless telephone 104A is also configured with a "lookup" button 118. When pressed, the "lookup" button 118 enables a lookup feature as described in more detail below.

In general, the lookup feature locates a name of a callee in a remote directory in response to a call initiated by the caller using the telephony devices 104 if it is determined that the name of the callee cannot be located in a local directory 120 residing on each of the telephony devices 104. The local directory 120 may be any data structure that facilitates an association between at least a callee network address (e.g., a phone number) and a callee name. One embodiment of a local directory 120 is described below with reference to FIG. 2.

An illustrative embodiment of a remote directory 124 is shown residing on the network server 106. Illustratively, the remote directory 124 is a table or tables within a database 122. A particular embodiment of the remote directory 124 as a table is described below with reference to FIG. 3. However, the particular configuration of the remote directory 124 is not limiting of the present invention, and persons skilled in the art will recognize other embodiments.

Figure 2:
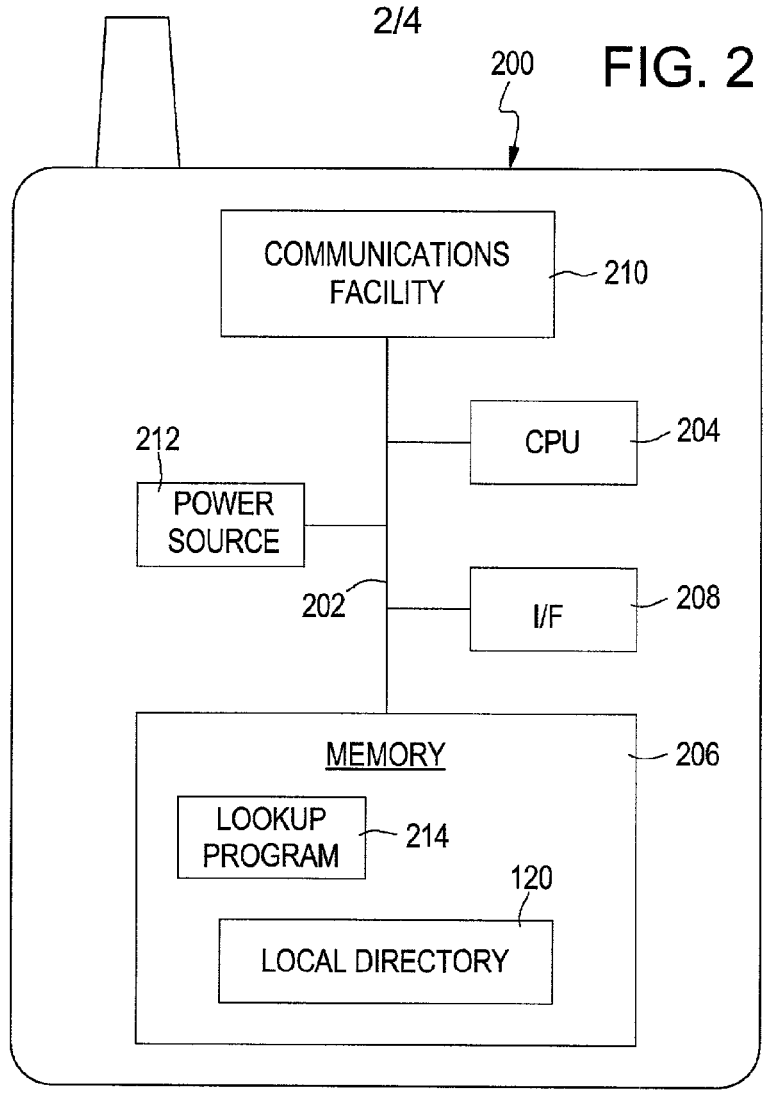
FIG. 2 is a schematic diagram of a telephony device.

FIG. 2 is an embodiment of a telephony device 200, which is representative of any of the telephony devices 104 shown in FIG. 1. In general, the telephony device 200 includes a bus 202 which connects a processor 204, a memory 206, an input/output device (i.e., an interface) 208, a communications facility 210 and a power source 212. It is understood that the architecture of the telephony device 104 shown in FIG. 2 is merely illustrative and that the devices may be connected differently and, in some cases, not directly connected via the bus 202.

The input/output device 208 is representative of any interface between the bus 202 and another device, such as the buttons 110, 112, 113 and 118, the display screen 114 and the keypad 116 (all shown in FIG. 1). The communications facility 210 is representative of any circuitry configured to support communications between the telephony device 200 and the communications network 102. As such, the communications facility 210 may include a transmitter and a receiver, for example. The power source 212 is representative of any power supply capable of energizing the telephony device 200. However, is understood that in other embodiments the power source 212 need not be on board the telephony device 200, such as with a power source in a wall power outlet.

The processor 204 may be any device capable of implementing the operations and methods described herein. In particular, the processor implements parsing of a user input comprising a network address and determining whether a callee name associated with the network address is located in a local directory residing on a telephony device. In operation, the processor 204 receives instructions from the memory 206 and performs operations according to the present invention.

The memory 206 may be a random access memory (RAM) and optionally nonvolatile or backup memory (e.g., electronic programmable read only memories (EPROM), flash memories, and the like). The memory 206 contains the necessary data and programming structures necessary for the operation of the telephony device 200. Illustratively, the memory 206 includes a lookup program 214 and a local directory 120. When the processor 204 is configured with the lookup program 214 steps are taken to locate a name of a callee based on a network address (e.g., a telephone number) input by a user/caller of the telephony device 200. Initially, the local directory 120 is accessed to determine whether the name is contained therein. If not, steps are taken to access the remote directory 124 (shown in FIG. 1) in order to locate the name.

One embodiment of the local directory 120 is shown in FIG. 2A. In general, the local directory 120 is shown as a table comprising a plurality of rows 220 and columns 222. The number of rows 220 and columns 222 is merely illustrative, and other embodiments may have more or less rows and columns. The columns 222 designate a variety of information categories, while the rows 220 define a plurality of records. Illustratively, the columns 222 include a phone number column 224, and Internet protocol (IP) address column 226, a domain name (or email address) column 228, and a callee name column 230. As used herein, a phone number, an IP address and a domain name are all instances of network addresses. As a result, each row, or record, associates one or more network addresses with a name of a callee.

Figure 3:
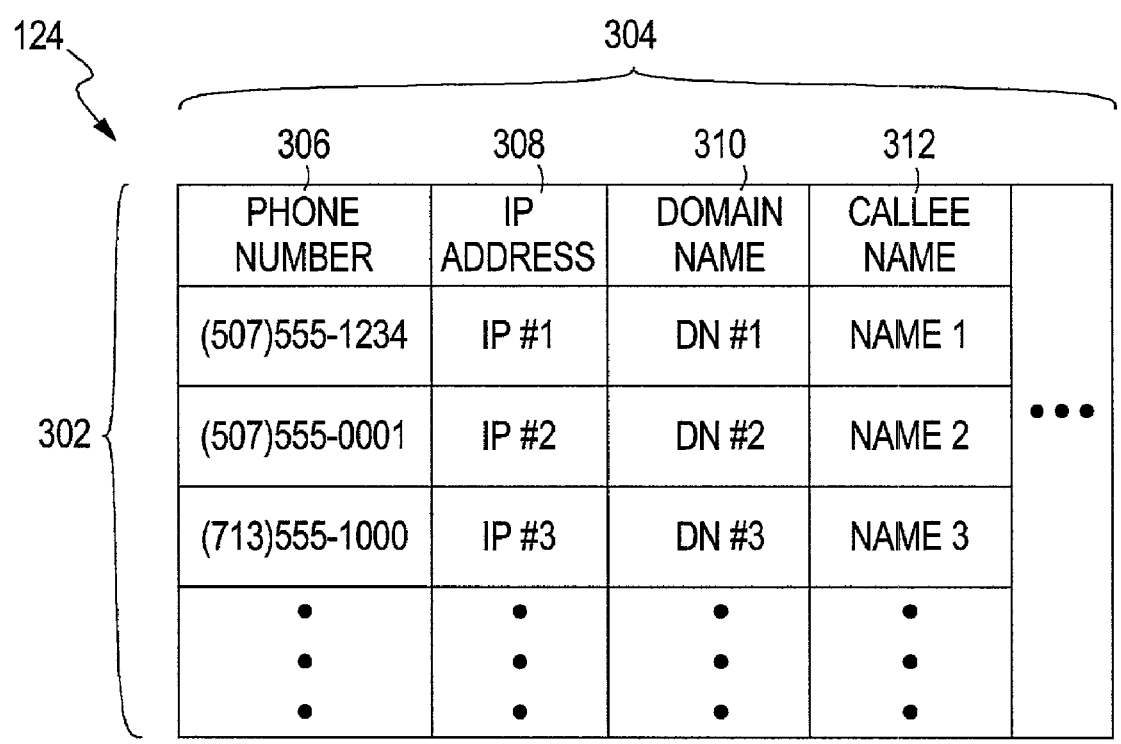
FIG. 3 is an illustration of a remote directory containing a plurality of records, each comprising one or more network addresses and an associated callee name.

FIG. 3 shows one embodiment of the remote directory 124. Illustratively, the remote directory 124 is a table organized as a plurality of rows 302 and columns 304. The number of rows 302 and columns 304 is merely illustrative, and other embodiments may have more or less rows and columns. In general, the remote directory 124 is arranged in a similar manner to the local directory 120. Accordingly, the remote directory 124 comprises a telephone number column 306, an IP address column 308, a domain name (or email address) column 310 and a callee name 312. However; is understood that the similar arrangement between the local directory 120 and the remote directory 124 is merely illustrative of one embodiment and that in other embodiments the local directory 120 and the remote directory 124 are arranged differently.

Figure 4:
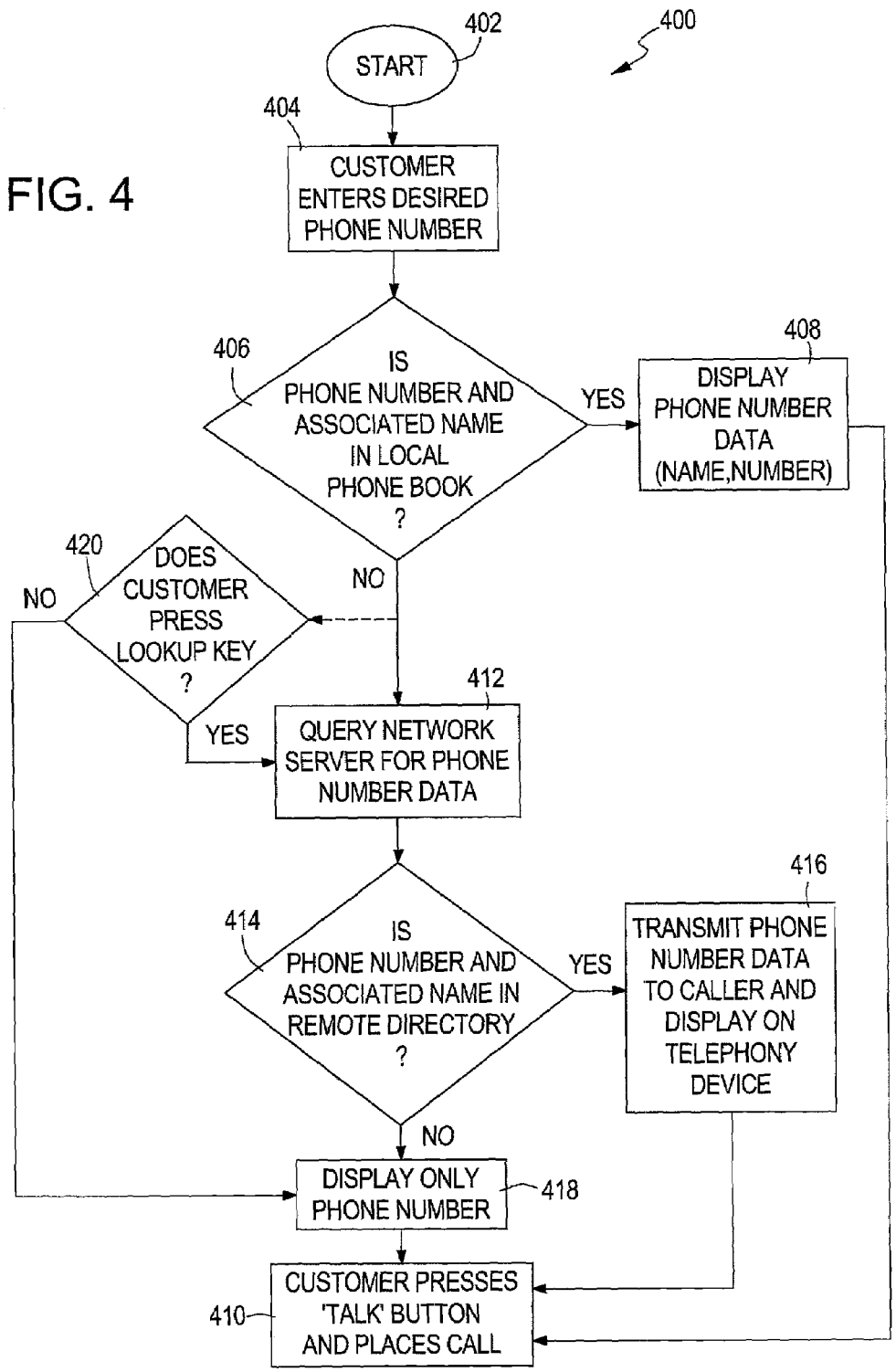
FIG. 4 is an illustration of a lookup method for locating a callee name associated with an input network address.

Referring at the FIG. 4 a method 400 is shown illustrating the operations of a telephony device when executing the lookup program 214 (shown in FIG. 2). For purposes of illustration, the method 400 performs a lookup operation in response to receiving a telephone number input by a caller. However, the input may be any network address including, for example, an IP address or a domain name.

The method 400 is entered at step 402 and proceeds to step 404 where a caller enters the desired phone number for a callee. At step 406, the method 400 queries whether the phone number and associated name is in the local directory 120. If so, at step 408, the telephone number and associated name are displayed on a display screen (e.g., the display screen 114 shown in FIG. 1) of the telephony device. The method 400 proceeds to step 410 where the user presses the talk button 113 to initiate the telephone call.

Returning to step 406, if a phone number and associated name are not found in the local directory 120, the method 400 proceeds to step 412 where a network server 106 is queried for the information. Specifically, a request for the callee name is transmitted from the telephony device to the network server 106 via the communications network 102. The telephone number entered by the user is passed in as a parameter to the network server 106 and is used by the network server 106 as a key to access the remote directory 124 located in the database 122. At step 414, the method 400 determines whether the desired associated callee name is located in the remote directory 124. If so, the associated callee name is transmitted back to the requesting telephony device which then operates to display the telephone number and associated callee name on the display screen 114 of the telephony device, as indicated by step 416. If the network server 106 is unable to locate the callee name at step 414, the method 400 proceeds to step 418 where the telephony device is notified of the result and operates to display only the telephone number on the display screen 114. Alternatively or additionally, the telephony device explicitly indicates to the user (e.g., by displaying a message on the display screen 114) that no matching name for the input telephone number could be located. In any case, the user then presses the talk button 113 to initiate the telephone call at step 410.

In another embodiment, the lookup feature described above is only performed in response to an explicit command received from the user. Such an embodiment is described by the optional step 420. In this embodiment, the method 400 proceeds to step 420 if step 406 is entered negatively, i.e., the telephone number was not located in the local directory 120. At step 420, the method 400 queries whether the user has pressed the lookup button 118. If so, the method 400 proceeds to step 412 where the remote directory 124 is queried for the data, as described above. If, however, the user does not press the lookup button 118, the method 400 proceeds directly to step 418. In this manner, the user is given the option of whether to submit a request to the network server 106 or, in the interest of time, to simply initiate the call without the callee name.

It should be understood that the method 400 is merely illustrative of one embodiment and persons skilled in the art will readily recognize other embodiments within the scope of the present invention. For example, the initial input received from a user may be a callee name, rather than a network address. In this case, steps are taken to locate the associated network address using the callee name as a key. In addition, the output provided to the user at steps 408, 416 and 418 need not be visual. For example, audio output may be provided to the user.

While the foregoing is directed to embodiments of the present invention, other and further embodiments of the invention may be devised without departing from the basic scope thereof, and the scope thereof is determined by the claims that follow.

What is claimed is:

1. A method of providing directory information to a user of a telephony device, comprising:
   receiving, by the telephony device, a user input comprising a network address, wherein the telephony device is a mobile phone and the network address is a telephone number;
   determining, by the telephony device, whether a callee name associated with the network address is located in a local directory residing on the telephony device; and
   if the callee name is not located in the local directory, requesting, by the telephony device, the callee name from a remote directory not located on the telephony device, wherein the input telephone number is passed as a parameter in the request to the remote directory, and wherein the telephone number is used as a key to look up the callee name in the remote directory, wherein the remote directory comprises a plurality of entries, each comprising a name and associated telephone number, wherein requesting the callee name is performed in response to an explicit user-initiated command input to the telephony device, the explicit user-initiated command being separate from the step of receiving the user input comprising the network address.

2. The method of claim 1, wherein requesting comprises transmitting, via a network, a request to a database containing the remote directory.

3. The method of claim 1, wherein the local directory comprises a plurality of records, each record comprising a network address entry and associated callee name entry.

4. The method of claim 1, further comprising:
   receiving, by the telephony device, a response from the remote directory; and
   if the response includes the callee name, displaying the callee name to the user on a display device of the telephony device.

5. The method of claim 4, further comprising, if the response does not include the callee name, displaying an unavailability message to the user indicating that the callee name is not available.

6. The method of claim 1, wherein the explicit user-initiated command input to the telephony device is an explicitly defined lookup command for requesting the callee name.

7. A telephony device, comprising:
   a communications facility configured to communicate with the telecommunications network; wherein the communications facility and the telecommunications network are configured to support transmission of at least voice data;
   a memory containing at least a lookup program and a local directory; the focal directory comprising a plurality of records, each record comprising a callee network address and an associated callee name;
   a lookup button; and
   a processor which, when configured with the lookup program, is configured to:
      (i) upon receiving a user input comprising a network address, determine whether a callee name associated with the network address is located in the local directory; and
      (ii) if not transmit, via the communications facility, a request for the callee name to a remote directory, wherein the request for the callee name is transmitted to the remote directory in response to pressing the lookup button, the lookup button being exclusively configured for transmitting the request.

8. The telephony device of claim 7, wherein the processor is further configured to:
   process a response to the request; and
   if the response includes the callee name, output the callee name to an output device.

9. The telephony device of claim 8, wherein the output device is a display screen.

10. The telephony device of claim 7, wherein the network address is a telephone number.

11. The telephony device of claim 7, wherein the telephony device is a wireless telephone.

12. The telephony device of claim 7, wherein the telephony device is a wireless telephone and the network address is a telephone number and wherein the processor is further configured to:
   process a response to the request; and
   if the response includes the cellee name, output the callee name to a display screen of the telephony device.

13. The telephony device of claim 12, wherein the processor is further configured to, if the response does not include the callee name, output an unavailability message to the display screen.

14. A computer readable medium containing a program which, when executed by a processor of a telephony device, is configured to perform operations comprising:
   parsing a user input comprising a network address;
   determining whether a callee name associated with the network address is located in a local directory residing on the telephony device; and
   if the callee name is not located in the local directory, requesting the callee name from a remote directory not located on the telephony device, wherein requesting the callee name is performed in response to an explicit user-initiated command input to the telephony device, the explicit user-initiated command being separate from the user input comprising the network address.

15. The computer readable medium of claim 14, wherein requesting comprises transmitting, via a network, a request to a database containing the remote directory.

16. The computer readable medium of claim 14, wherein the local directory comprises a plurality of records, each record comprising a network address entry and associated callee name entry.

17. The computer readable medium of claim 14, wherein the network address is a telephone number.

18. The computer readable medium of claim 14, wherein the telephony device is a wireless telephone and the network address is a telephone number and wherein requesting comprises transmitting, via a telephone network, a request to a database containing the remote directory.

19. The computer readable medium of claim 14, further comprising:
   receiving a response from the remote directory; and
   if the response includes the callee name, displaying the callee name to the user on a display device of the telephony device.

20. The computer readable medium of claim 19, further comprising, if the response does not include the callee name, displaying an unavailability message to the user indicating that the callee name is not available.

21. A telecommunications system, comprising a network server comprising a database, the database containing at least a remote directory; wherein the network server is configured to:
   upon receiving, from a requesting telephony device, a request device for a callee name associated with a particular network address, access the remote directory to determine the availability of the callee name; wherein the request is received only after the requesting telephony device has determined that the callee name is not available locally on the requesting telephony device and wherein the request for the callee name is transmitted to the network server in response to a lookup button of the telephony device being pressed, the lookup button being exclusively configured for transmitting the request; and
   if the callee name is available in the remote directory, transmit the callee name to the requesting telephony device via a network connection.

22. The system of claim 21, wherein the network server is a part of a base station for a wireless telephone system.

23. The system of claim 21, wherein the remote directory comprises a plurality of records, each record comprising at least one network address and associated callee name.

24. The system of claim 21, wherein the particular network address is a telephone number.

* * * * *